United States Patent [19]
Benko et al.

[11] 3,864,276
[45] Feb. 4, 1975

[54] LIGNIN DISPERSING AGENTS AND METHOD OF MAKING SAME
[75] Inventors: Julius Benko, Sillery; Gilles Daneault, Sainte Foy, both of Quebec, Canada
[73] Assignee: Dryden Chemical Limited, Ontario, Calif.
[22] Filed: Oct. 2, 1972
[21] Appl. No.: 293,898

[52] U.S. Cl............. 252/354, 8/83, 8/173, 252/313 R, 252/317, 252/353
[51] Int. Cl................................ B01f 17/50
[58] Field of Search.................. 252/354, 353

[56] References Cited
UNITED STATES PATENTS

| | | | |
|---|---|---|---|
| 2,053,276 | 9/1936 | Ellis | 252/354 X |
| 2,491,832 | 12/1949 | Salvesen et al. | 252/353 X |
| 2,680,113 | 6/1954 | Adler et al. | 260/124 |
| 2,933,452 | 4/1960 | Byrd | 252/353 |
| 3,153,564 | 10/1964 | Morgan | 252/354 X |
| 3,509,121 | 4/1970 | Benko | 260/212 X |

*Primary Examiner*—Richard D. Lovering
*Attorney, Agent, or Firm*—Weir, Marshall, MacRae & Lamb

[57] ABSTRACT

This invention relates to the production of dispersing agents from mixtures of spent sulphite liquor solids and Kraft liquor solids. Although appropriate physical mixtures of said solids without further treatment have useful dispersant characteristics for specific applications, the preferred way of preparing improved dispersant compositions from mixtures of said solids consists in heat treating concentrated aqueous solutions thereof for 1 to 3 hours at 100° to 160°C, at pH values higher than 11.0. The heat treatment is preferably performed under simultaneous blowing of air through the reaction mixture. The addition of a crosslinking agent, such as formaldehyde, is optional in cases where the air blowing treatment is not employed during the heat treatment. The dispersing agents of this invention have utility as dye dispersants, carbon black dispersants, clay dispersants, and the like.

8 Claims, No Drawings

3,864,276

LIGNIN DISPERSING AGENTS AND METHOD OF MAKING SAME

BACKGROUND OF THE INVENTION

1. Field of the Invention

This invention relates to the production of dispersing agents from mixtures of spent sulphite liquor solids and Kraft liquor solids.

2. Description of the Prior Art

The dispersant properties of lignosulphonates contained in spent sulphite liquors have been known since the beginning of this century, and several utilizations of the spent sulphite liquor are based upon the dispersant properties of lignosulphonates, its major component.

One of the first recorded uses of spent sulphite liquor solids in textile dyeing operations was described in German Pat. No. 222,191 of Mar. 5, 1909. At that time the requirements for dye dispersants were not severe and, thus, simple modifications and treatments of spent sulphite liquor were sufficient to produce dye dispersants acceptable for the then industrial practice. with the advancement of dyeing techniques in general, and the development of disperse dyes and dyeing techniques at high temperatures in particular, the requirements for acceptable dye dispersants have become more and more severe and, therefore, the successful ways of preparing them have become more and more elaborate.

The best dye dispersants prepared from spent sulphite liquor presently available have all been subjected to two different major treatments: namely, (1) a chemical treatment step to improve upon the dispersant properties of the lignosulphonate materials and (2) a physico-chemical treatment step consisting of fractionation for separating the dispersants from the non-dispersant components of the spent sulphite liquor. The sequence of the two steps may or may not be reversible depending upon the particular processing conditions.

A dye dispersant, particularly a disperse dye dispersant, has to have good or at least acceptable properties in the following:

a. Grinding efficiency.
b. Dye dispersant efficiency.
c. Heat stability.
d. Low staining characteristics.
e. Good exhaustion characteristics.
f. Low viscosity in concentrated solutions.

Usually, none of the dye dispersants, whether prepared from spent sulphite liquors or from other raw materials, is capable of perfectly fulfilling all the above requirements. This implies that for specific applications, even within the same group of dyes such as disperse dyes or for different preparations from the same dye (dry powder as compared with dye paste), a careful selection of the dispersant has to be made, which usually involves compromises with respect to the above six criteria.

Chemical treatments employed in the preparation of improved dye dispersants from spent sulphite liquor solids include:

a. Oxidative treatments.
b. Alkaline heat treatments.
c. Heat treatments in acid media.
d. Crosslinking (with ethyleneoxide, for example).
e. Reduction with Zn powder in alkaline medium.
f. Desulphonation.

Fractionation of the spent sulphite liquor products prior to or following any of the above chemical treatments is necessary, because the said reaction products are heterogeneous and the useful end-effect of some of their components becomes greatly diluted by the inert components of the mixture unless fractionation is performed. In addition to the undesired effect of dilution by inert components, harmful effects of the non-active ingredients of the chemically treated spent sulphite liquor have also occasionally been observed. For these reasons as well as the fact that in many dyestuff formulations there is no space for inactive ingredients, fractionation of the spent sulphite liquor products used for dye dispersants has become the general practice. The need for fractionation and one way of performing it have been described by J. Benko in U.S. Pat. No. 3,509,121 (Apr. 28, 1970).

Dispersant properties of the lignin material derived from the Kraft pulping process have also been known for a long time, although industrial utilization of dispersants prepared from Kraft lignins was much slower and is less common than the dispersant applications of lignosulphonates. The major difficulty in the successful application of Kraft lignins for a variety of dispersant applications is due to the fact that Kraft lignins do not form stable solutions or suspensions except in strongly alkaline media of pH 11 or above, while most of the possible dispersant applications require a pH stability at much lower pH values. It was due to this lack of solubility of Kraft lignins at neutral and slightly acid pH values that sulphonation of Kraft lignins was introduced for making dispersant preparations therefrom. Significant improvements in this regard have been obtained through chemical treatments described by G. H. Thomlinson et al in U.S. Pat. No. 2,406,867 (Sept. 3, 1946) and by E. Adler et al. in U.S. Pat. No. 2,680,113 (July 1, 1954), and industrial utilization of Kraft lignins as dispersants, including dye dispersants, has ensued. In the production of dye dispersants from Kraft lignins the two basic steps are:

1. Fractionation of the Kraft lignins from Kraft liquor by means of acid precipitation, and
2. Sulphonation with or without crosslinking with formaldehyde.

The approaches to the utilization of the two major types of industrially available lignin materials, namely, lignosulphonates and Kraft lignins, for exacting dispersant applications, such as dye dispersant applications, have in common the need for fractionation of the lignin from the non-lignin materials, such as sugars, sugar acids and inorganic compounds. When comparing the chemical treatments, however, one observes that some of the chemical treatments of the lignosulphonate aim for the properties found in the Kraft lignins, namely: (1 the increase of the phenolic groups and 2) the reduction of sulphonic groups. On the other hand, some of the treatments of the Kraft lignins aim for an improvement of their end-use properties through (1) introduction of sulphonic groups, and (2) increase of molecular size, properties which are readily available in lignosulphonates.

SUMMARY OF THE INVENTION

It has now been found that preparations from blends of spent sulphite liquors and Kraft liquors, according to the present invention, have unexpectedly advantageous dye dispersant properties. Lignosulphonates contained in the spent sulphite liquor and the alkali lignin contained in the Kraft liquor may be processed, according to the present invention, in such a way as to yield compositions that are (a) stable at neutral and moderatley acid pH values, (b) characterized by a suitable combination of dye dispersant properties having, among others, excellent grinding, dispersing and heat stability characteristics, and (c) further characterized by having acceptable, that is not excessively high, viscosities.

It is generally accepted in industrial practice that both the spent sulphite liquor solids and the Kraft liquor solids have to be fractionated, apart from being chemically treated in a variety of manners, in order to obtain dye dispersant preparations therefrom. All such fractionated preparations are characterized by a high lignin content, since part or all of the non-lignin components have been purposely removed. It was therefore surprising to find that dye dispersant properties equal to those obtainable according to the prior art may be obtained, for some applications, from a mixture of unfractionated spent sulphite liquor solids and unfractionated Kraft liquor solids treated according to the present invention. It was surprising to find that compositions of matter having 50 percent or less lignin content, with the balance of material consisting mostly of sugar acids and inorganic compounds, have for some applications dye dispersant properties equal to compositions prepared according to the prior art and consisting of fractionated and nearly pure lignin compositions from either spent sulphite liquor or Kraft lignins. Experimental evidence indicates that the improvements available through fractionation and a variety of chemical treatments are in several instances just about equal to the improvements available through purposeful combination and crosslinking of spent sulphite liquor and Kraft liquor solids, both being used without fractionation. Superior performance of mixtures, as compared to the performance of either one of its components alone, indicates a synergistic effect. The economic advantages of using synergistic compositions and simultaneously avoiding fractionation and/or elaborate chemical treatments are obvious.

It has further been found that appropriate crosslinking of Kraft lignins with lignosulphonates by a variety of means may replace the otherwise necessary step of sulphonating Kraft lignin and yield improved dye dispersing agents stable at neutral and slightly acid pH values.

Hydrogen linkages are known to be important in aqueous solutions of spent sulphite liquors (LIGNINS, K. V. Sarkanen & C. H. Ludwig, Wiley-Interscience, 1971, p. 750). It has been found that hydrogen linkages are readily established while mixing aqueous solutions of spent sulphite liquor solids and Kraft liquor solids at above pH 11.0 at room temperature. After such mixing, the pH of said mixture may be lowered to neutral or even to a slightly acid pH without substantial precipitation of the Kraft lignin component therefrom. Apparently the linkage of Kraft lignins to lignosulphonates by means of hydrogen linkages prevents such precipitation. Such simple physical mixtures of Kraft liquors and spent sulphite liquors display dye dispersant properties sufficient for selected applications.

A further increase in the cross-linking between spent sulphite liquor solids and Kraft liquor solids yields compositions of matter characterized by improved dye dispersant characteristics and by improved low-pH stability. It is indicated by a variety of dye dispersant evaluation data that said increased crosslinkage, rather than the crosslinkage by means of hydrogen bonds alone, is desirable for obtaining dye dispersant preparations for general applicability. On the other hand, excessive crosslinking is to be avoided, since the resulting excessive viscosities are detrimental in the application of dye dispersants. The grinding of dyecakes with excessively viscous dye dispersants calls for greater than usual dilution which, in turn, diminishes the efficiency of the mill and which also reduces the efficiency in the subsequent drying operation. Crosslinking between the spent sulphite liquor solids and the Kraft liquor solids may be obtained by heating mixtures thereof with or without (a) the addition of formaldehyde or (b) oxidation by air blowing.

DESCRIPTION OF THE PREFERRED EMBODIMENT

Dye dispersant compositions according to one embodiment of the present invention contain between about 15 to 85 percent unfractionated spent sulphite liquor solids, with the balance of the material consisting of unfractionated Kraft liquor solids. Using less than about 15 percent spent sulphite liquor solids results in insufficient solubility of such compositions at lower pH values, while using less than about 15 percent Kraft liquor solids results in markedly diminishing improvements due to the insufficient addition of Kraft lignin material. Since both spent sulphite liquor solids and Kraft liquor solids are usually available in ample quantities and at low costs, there is no need to try to minimize the use of either one of these components and thus the preferred range of ingredients in the compositions is between 30 and 70 percent spent sulphite liquor solids with the balance being Kraft liquor solids. In another embodiment of the invention where fractionated materials are used, high molecular weight Kraft lignin is preferred for superior performance and such compositions may then contain between 10 and 75 percent of said high molecular weight Kraft lignin material with the balance being spent sulphite liquor solids.

The crosslinking between the spent sulphite liquor solids and the Kraft liquor solids can be obtained in the following ways:

1. By heat treating mixtures of liquors containing said solids between 100° and 160°C for 1 to 3 hours, at pH values above 11.0 and at solids concentrations between 20 and 50 percent.
2. By heat treating as in (1), with the addition of up to about 1 percent formaldehyde on the solids basis.
3. By heat treating as in (1), under simultaneous oxidation by means of air blowing.

The present invention is further described in the following Examples I to VI with their associated Tables I to VI, in which are assembled data from 45 experiments as a means of illustration and not of limitation.

The spent sulphite and the Kraft liquors used in the experiments were taken from industrial softwood pulping operations. The following notes further explain certain experimental conditions:

A. The spent sulphite liquor solids were preferably used in the sodium salt form.

B. For fractionation to obtain the high molecular weight lignins, the Kraft liquor was treated by acidification as described in the Thomlinson et al., patent and the Sarkanen & Ludwig text "Lignins," both mentioned hereinbefore. The high molecular weight fractions of the spent sulphite liquor solids were prepared by the fractionation process described in the aforementioned U.S. Pat. No. 3,509,121.

C. In order to maintain the pH of all preparations above 11.0 during the processing steps, the pH of the spent sulphite liquor solids in solution was raised to over 13.0 prior to admixing with the Kraft liquor solutions. It was found that about 10 percent by weight of sodium hydroxide, calculated on the solids basis, was required to be added to the spent sulphite liquor solids to be assured of a pH above 13.0. All spent sulphite liquor solids additions referred to in the Examples take into account such pH-adjusted solutions.

D. The pH-adjusted spent sulphite liquor solids solution may be first subjected to a heat treatment and then blended with the Kraft liquor solids solution for further heat treatment, or it may be first blended with the Kraft liquor solids solution and then subjected to a heat treatment, without any preliminary heat treatment. There appears to be no adherent advantage in the quality of the resulting compositions from either one operational procedure or the other.

E. The addition of small quantities of formaldehyde (up to about 1.0 percent on solids basis) during the heat treatment reaction results in improvement of rewetting properties and low pH stabilities.

F. Dye dispersant evaluation data are presented customarily on a comparative basis: that is, the performance of sample preparations is compared with the performance of an industrially accepted dye dispersant of excellent quality. The testing is performed as follows: dye pastes are sand milled with the dispersant on a laboratory bench scale, under identical conditions, and the thus prepared dispersions are tested for dispersion and heat stability. The dispersion characteristics are tested by filtering the dispersion obtained by means of milling the dye-cake with the dispersant under standard conditions, and heat stability is established by means of several filter tests performed after different intervals of steam heating of the dispersions. The appearance of heavy residual matter indicates in the former case insufficient dispersion and, in the latter, the breaking of the dispersion due to excessive heat treatment. Although a well qualified tester observes several additional properties of the dispersant in the course of the testing, such as efficiency of grinding, ease of rewetting and viscosity, only heat stability data are tabulated in Tables I to V. This is done in order to present the data in an easy to understand manner, using the most important criterion only for the purpose of comparison. It is understood that good heat stability properties cannot be obtained under the standard experimental conditions if rewetting, grinding and dispersing properties as well as viscosity of the sample are not at least acceptable.

EXAMPLE I

Five different blends of Kraft lignin solids and spent sulphite liquor solids with three control samples of non-blended materials were heat treated under various reaction conditions to provide dispersant compositions as set out in Table I. Table I indicates the limits of blending ratios which resulted in useful compositions for dye dispersant applications. Experiments 4 and 5 show that blends having from about 10 to about 75 percent high molecular weight (HMW) Kraft lignins with the balance being spent sulphite liquor solids produced remarkably better dispersants than the non-blended materials of Experiments 1 to 3.

EXAMPLE II

Seven different blends of unfractionated Kraft and unfractionated sulphite liquor solids were heat treated under various conditions to provide dispersant compositions as set out in Table II. Experiments 9 to 15 indicate that blended compositions containing from about 30 to about 70 percent unfractionated Kraft lignins with the balance being unfractionated spent sulphite liquor solids are suitable for dye dispersant applications.

EXAMPLE III

In addition to previous Experiments 4 and 5, Experiments 16 to 20 are directed to heat treating, under various conditions, further blends of high molecular weight Kraft lignins and unfractionated spent sulphite liquor solids as set out in Table III.

TABLE I

Limits of blending proportions for the production of efficient dye dispersants within the scope of the present invention.

| | COMPOSITION | | REACTION CONDITIONS | | | | |
|---|---|---|---|---|---|---|---|
| Exp. No. | Kraft Lignin Solids, % | Spent Sulphite Liquor Solids, % | % HCHO Added On Solids Basis | Temperature °C | Period hrs. | Solids Concentration w/v | Dye dispersant evaluation on Disperse Polyester Red: Heat Stability (minutes) |
| 1 | none | 100 | 1.1 | 140 | 1½ | 51.0 | 9 min. (13 min.) |
| 2 | unfractionated, 100 | none | 1.4 | 140 | 1½ | 47.9 | does not disperse |
| 3 | HMW*, 100 | none | 0.8 | 140 | 1½ | 19.4 | does not disperse |
| 4 | HMW, 75 | 25 | 0.5 | 150 | 1½ | 29.0 | 17 min. (13 min.) |
| 5 | HMW, 10 | 90 | 1.0 | 140 | 1½ | 41.4 | 12 min. (13 min.) |
| 6 | unfractionated, 15 | 85 | 0.67 | 140 | 1½ | 49.1 | 8 min. (8 min.) |
| 7 | unfractionated, 85 | 15 | 0.67 | 140 | 1½ | 50.2 | 11½ min. (8 min.) |
| 8 | unfractionated, 92 | 8 | 0.67 | 140 | 1½ | 48.5 | does not disperse |

*HMW - High Molecular Weight
NOTE: The heat stability data in backets are the test results obtained on the same dyecake using a commercial dye dispersant of excellent quality. Results in Table I indicate a remarkable difference in the quality of the dyecakes for the first five and the last two tests, and emphasize the necessity for strict comparative testing in all dye dispersant evaluation.

TABLE II

Dye dispersant preparations from unfractionated Kraft and unfractionated spent sulphite liquor solids.

| | COMPOSITION | | REACTION CONDITIONS | | | | Dye dispersant evaluation with Disperse Polyester Red: Heat Stability (minutes) |
|---|---|---|---|---|---|---|---|
| Exp. No. | Kraft Liquor Solids % | Spent Sulphite Liquor Solids, % | % HCHO Added On Solids Basis | Temperature °C | Period Hrs. | Solids Concentration w/v | |
| 9 | 30 | 70 | 1.3 | 140 | 1½ | 48.7 | 12 min. (13 min.) |
| 10 | 50 | 50 | 1.3 | 140 | 1½ | 51.0 | 14 min. (13 min.) |
| 11 | 70 | 30 | 1.3 | 140 | 1½ | 48.9 | 19 min. (13 min.) |
| 12 | 30 | 70 | none | 140 | 1½ | 51.4 | 8 min. (8 min.) |
| 13 | 50 | 50 | none | 140 | 1 | 49.1 | 8½ min. (8 min.) |
| 14 | 70 | 30 | none | 140 | 1½ | 49.7 | 11 min. (8 min.) |
| 15 | 70 | 30 | 0.5 | 140 | 1 | 49.6 | 16 min. (8 min.) |

NOTE: The heat stability data in brackets are the test results obtained on the same dyecake using a commercial dye dispersant of excellent quality. Results in Table II indicate a remarkable difference in the quality of the dyecakes used for the first three and the last four experiments and emphasize the necessity for strict comparative testing in all dye dispersant evaluation.

TABLE III

Dye dispersant preparations from HMW Kraft Liquor solids and unfractionated spent sulphite liquor solids.

| | COMPOSITION | | REACTION CONDITIONS | | | | Dye dispersant evaluation with Disperse Polyester Red: Heat Stability (minutes) |
|---|---|---|---|---|---|---|---|
| Exp. No. | HMW Kraft Solids, % | Spent Sulphite Liquor Solids, % | % HCHO Added On Solids Basis | Temperature °C | Period hrs. | Solids Concentration w/v | |
| 5 | 10 | 90 | 1.0 | 140 | 1½ | 41.4 | 12 min. (13 min.) |
| 16 | 20 | 80 | 0.6 | 140 | 1½ | 41.7 | 14 min. (13 min.) |
| 17 | 10 | 90 | none | 150 | 2 | 50.3 | 13 min. (13 min.) |
| 18 | 25 | 75 | none | 150 | 2 | 43.0 | 14 min. (13 min.) |
| 19 | 25 | 75 | 0.25 | 150 | 2 | 43.0 | 15 min. (13 min.) |
| 20 | 50 | 50 | 0.5 | 140 | 1½ | 27.3 | 17 min. (13 min.) |
| 4 | 75 | 25 | 0.5 | 150 | 1½ | 29.0 | 17 min. (13 min.) |

NOTE: In addition, dye testing of the sample described in Exp. No. 4 results in very good 10 minute heat stability on Disperse Red 17 and in fair heat stability on Disperse Red 60. The heat stability data in brackets are the test results obtained on the same dyecake, using a commercial dye dispersant of excellent quality.

TABLE IV

Dye dispersant preparations from blends of HMW Kraft lignin and HMW spent sulphite liquor solids.

| | Composition Percentages | | Reaction Conditions | | | | Dye Dispersant Evaluation | | |
|---|---|---|---|---|---|---|---|---|---|
| Exp. No. | HMW Kraft Lignin | HMW Spent Sulphite liquor solids | % HCHO Added On Solids Basis | Temp. °C. | Period hours | Solids Concentration % w/v | On Disperse Polyester Red: Heat Stability (minutes) | On Disperse Red No 60: Heat Stability (5 min.steaming) | On Disperse Red No 17: Heat Stability (10 min.steaming) |
| 21 | 70 | 30 | none | none | none | 29.1 | 11 | not tested | not tested |
| 22 | 70 | 30 | none | 115 | 1 | 29.1 | 11 | not tested | not tested |
| 23 | 70 | 30 | 0.25 | 115 | 1 | 29.1 | 11½ | not tested | not tested |
| 24 | 75 | 25 | 2.0 | 150 | 2 | 30.0 | not tested | fair-good | good |
| 25 | 50 | 50 | 1.0 | 150 | 2 | 31.2 | not tested | poor | good |
| 26 | 75 | 25 | 0.5 | 150 | 1½ | 30.0 | not tested | good | good |
| 27 | Commercial product of excellent quality | | | | | | 9 | good | good |

TABLE V

The effect of air-blowing on dye dispersant preparations made from unfractionated Kraft liquor solids and unfractionated spent sulphite liquor solids.

| | Composition | | | Reaction conditions | | | Dye dispersant evaluation on Disperse polyester Red:Heat stability (min) |
|---|---|---|---|---|---|---|---|
| Exp. Nos. | Kraft liquor solids | Spent sulphite liquor solids | Temp. °C | Period, hours | Solids conc. w/v | Air blowing | |
| 28 | 70 | 30 | 120 | 2 | 40 | yes | 8 |
| 29 | 70 | 30 | 120 | 2 | 40 | none | poor rewetting |
| 30 | 70 | 30 | none | none | 40 | none | poor rewetting |
| 31 | 70 | 30 | 135 | 3 | 41.3 | yes | 8½ |
| 32 | 70 | 30 | 135 | 2 | 41.3 | yes | 8 |
| 33 | 70 | 30 | none | none | 41.3 | none | poor rewetting |
| 34 | Commercial product of excellent quality | | | | | | 9 |

NOTE: In addition to improving the rewetting properties, air blowing also eliminates the characteristic odour of Kraft liquor.

TABLE VI

Stability of dye dispersant preparations made from blends of Kraft liquor solids and spent sulphite liquor solids in weak acid media.

| Exp. No. | Composition | | Reaction Conditions | | | | Volume % precipitate from solutions of | | | |
|---|---|---|---|---|---|---|---|---|---|---|
| | Kraft liquor solids, % | Spent sulphite liquor solids, % | % HCHO added | Temp. °C. | Period, hours. | solids conc. w/v. | 2.0% solids | | 0.5% solids | |
| | | | | | | | pH 5.0 | pH 3.0 | pH 5.0 | pH 3.0 |
| 35 | 75 | 25 | 2.0 | 150 | 2 | 30 | 0.2 | 0.2 | 0.1 | 0.1 |
| 36 | 75 | 25 | 0.5 | 150 | 2 | 30 | 0.1 | 20+ | trace | 20+ |
| 37 | 70 | 30 | none | none | none | 29.1 | 3.0 | 20+ | none | 20+ |
| 38 | 50 | 50 | none | 150 | 1½ | 30 | trace | trace | none | none |
| 39 | 50 | 50 | 0.8 | 150 | 1½ | 30 | 0.1 | 0.1 | trace | trace |
| 40 | 50 | 50 | none | none | none | 30 | trace | 20+ | trace | 20+ |
| 41 | 100 | — | none | none | none | 28.8 | 4.0 | 20+ | trace | 20+ |
| 42 | 70 | 30 | none | 135 | 3 | 41.3 | 0.1 | 0.1 | none | trace |
| 43 | 70 | 30 | none | 135 | 2 | 41.3 | trace | 12 | none | none |
| 44 | 70 | 30 | none | 135 | 1 | 41.3 | trace | 20+ | none | none |
| 45 | 70 | 30 | none | none | none | 41.3 | trace | 20+ | none | 20+ |

NONE: — The extent of precipitation from solutions of 2.0% and 0.5% solids concentration was established using a method originally devised for sludge determination in spent sulphite liquor solids. The sample is centrifuged at 3000 rpm. for 30 minutes and the volume percent of the precipitate is read directly from the calibration of the test tube, which is calibrated up to 20% volume.

EXAMPLE IV

Six different blends of fractionated Kraft and fractionated spent sulphite liquor solids were heat treated under various conditions to provide dispersant compositions as set out in Experiments 21 to 26 of Table IV. These compositions were favourably compared with a good commercial product (Experiment 27) in a heat stability dye dispersant evaluation test as shown in Table IV.

EXAMPLE V

Six different blends of unfractionated Kraft and unfractionated spent sulphite liquor solids were heat treated under various conditions in Experiments 28 to 33 to show the effect of air-blowing in the production of useful dispersants. These compositions were then compared with a good commercial product (Experiment 34) to show that air blowing during the heat treatment process improves the dispersant properties of the blended compositions. The results are listed in Table V.

EXAMPLE VI

Three different compositions containing 50, 70 and 100 percent Kraft liquor solids and the remaining percentages being spent sulphite liquor solids were heat treated under various conditions and the resulting compositions were then compared in Experiments 35 to 45 of Table VI with compositions obtained from similar blends of solids not subjected to heat treatment. Table VI enumerates the conditions of Experiments 35 to 45 and shows the stability of dilute solutions of certain dye dispersants in slightly acidic media of pH's 5.0 and 3.0.

The products of the present invention have utility as dispersants in applications other than as dye dispersants and in the following Example VII there are described two further uses of these blends of spent sulphite liquor solids and Kraft lignins as carbon black and clay dispersants. The blend identified as CP 51 consisted of 67 percent Kraft lignins and 33 percent spent sulphite liquor solids, and was heat treated for 2 hours at 150°C. with the addition of 0.5 percent formaldehyde on a solids weight basis.

EXAMPLE VII

A. Carbon Black Dispersion

CP 51 was added in the form of a 10 percent aqueous solution to a 20 percent aqueous slurry of carbon black. The addition of 6.0 percent dispersant (weight/weight basis) yielded a slurry having a viscosity of 66 cp. while the addition of 7.5 percent dispersant (w/w) yielded a slurry having a viscosity of 37.2 cp.

B. Clay Dispersion

Data relating to the clay dispersant efficiency of CP 51 as compared with prior art dispersants, are shown in the following Table VII. All measurements were made on 200 g aliquots of an 8.14 percent Wyoming hydrogel bentonite slurry in water. Following the addition of 1 ml quantities of 10 percent dispersant solution, the slurry was mixed for five minutes and viscosity readings were then taken on a Brookfield viscosimeter.

TABLE VII

Viscosity Changes in Centipoises following the Addition of Dispersant Solutions to Wyoming Hydrogel Bentonite Slurries

| Addition in ml of 10% solution of dispersant | Water (control) | CP 51 | Sodium Salt Spent Sulphite Liquor | Kraft Lignin Fractionated (acid precipitated) | Kraft Spent Liquor Unfractionated |
|---|---|---|---|---|---|
| None | 1700 | 1750 | 1700 | 1700 | 1700 |
| 1 | 1500 | 1160 | 1160 | 1300 | 1800 |
| 2 | 1400 | 960 | 960 | 1140 | 1800 |
| 3 | 1300 | 1040 | 840 | 1032 | 1800 |
| 4 | 1200 | 900 | 800 | 1030 | 1800 |
| 5 | 1100 | 800 | 840 | 1034 | 2500 |

We claim:

1. A dispersant composition consisting essentially of a blend of Kraft liquor solids cross-linked with spent sulphite liquor solids, said solids being selected from the group consisting of the unfractionated liquor solids and the high molecular weight fractions thereof and said Kraft liquor solids comprising from about 10 percent to about 85 percent of said blend, on a solids weight basis, with said sulphite liquor solids comprising the remainder.

2. A composition as defined in claim 1, wherein unfractionated Kraft liquor solids comprise from about 15 to about 85 percent of the blend, on a solids weight basis, and unfractionated spent sulphite liquor solids comprise the remainder.

3. A composition as defined in claim 1, wherein high molecular weight Kraft lignins comprise from about 10 to about 75 percent of the blend on a solids weight basis.

4. A dispersant composition consisting essentially of a blend of Kraft liquor solids cross-linked with spent sulphite liquor solids, said solids being selected from the group consisting of the unfractionated liquor solids and the high molecular weight fractions thereof and said Kraft liquor solids comprising from about 10 to about 85 percent of said blend, on a solids weight basis, with said sulphite liquor solids comprising the remainder, in the form of a concentrated aqueous solution.

5. A dispersant composition consisting essentially of a blend of Kraft liquor solids cross-linked with spent sulphite liquor solids, said solids being selected from the group consisting of the unfractionated liquor solids and the high molecular weight fractions thereof and said Kraft liquor solids comprising from about 10 to about 85 percent of said blend, on a solids weight basis, with said sulphite liquor solids comprising the remainder, in the form of a spray dried powder.

6. A process for improving the dispersant properties of a blend of (1) from about 10 to about 85 percent Kraft liquor solids, on a solids weight basis, and (2) spent sulphite liquor solids comprising the remainder, both said solids being selected from the group consisting of the unfractionated liquor solids and high molecular weight fractions thereof, which comprises subjecting said blend in a 25 to 50 percent w/v aqueous solution to heat treatment at a temperature in the range of about 115°C to 160°C for from 1 to 3 hours.

7. The process defined in claim 6, wherein said heat treatment is carried out under simultaneous air blowing.

8. The process defined in claim 6, wherein said solution additionally contains up to about 1.0 percent formaldehyde on a solids weight basis.

* * * * *

PO-1050
(5/69)

UNITED STATES PATENT OFFICE
CERTIFICATE OF CORRECTION

Patent No. 3,864,276            Dated February 4, 1975

Inventor(s) Julius Benko and Gilles Daneault

It is certified that error appears in the above-identified patent and that said Letters Patent are hereby corrected as shown below:

Title page, item [73]

change "Calif." to -- Canada --.

Signed and sealed this 29th day of April 1975.

(SEAL)
Attest:

RUTH C. MASON  
Attesting Officer

C. MARSHALL DANN  
Commissioner of Patents  
and Trademarks

PO-1050
(5/69)

UNITED STATES PATENT OFFICE
CERTIFICATE OF CORRECTION

Patent No. 3,864,276     Dated August 6, 1975

Inventor(s) Julius Benko and Gilles Daneault

It is certified that error appears in the above-identified patent and that said Letters Patent are hereby corrected as shown below:

Title page, item [73] should read:-

Dryden Chemicals Limited,
Dryden, Ontario, Canada

Signed and Sealed this

Twenty-third Day of November 1976

[SEAL]

Attest:

RUTH C. MASON
*Attesting Officer*

C. MARSHALL DANN
*Commissioner of Patents and Trademarks*